US012738056B2

(12) United States Patent
Lee et al.

(10) Patent No.: US 12,738,056 B2
(45) Date of Patent: Sep. 15, 2026

(54) APPARATUS FOR RECOGNIZING ACTIVITY IN SPORTS VIDEO USING CROSS GRANULARITY ACCUMULATION MODULE AND METHOD THEREOF

(71) Applicant: Foundation of Soongsil University-Industry Cooperation, Seoul (KR)

(72) Inventors: Soowon Lee, Seoul (KR); KwangHyun Ryu, Goyang-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 337 days.

(21) Appl. No.: 18/710,118

(22) PCT Filed: Mar. 7, 2022

(86) PCT No.: PCT/KR2022/003141
§ 371 (c)(1),
(2) Date: Nov. 8, 2024

(87) PCT Pub. No.: WO2023/113105
PCT Pub. Date: Jun. 22, 2023

(65) Prior Publication Data

US 2025/0069393 A1 Feb. 27, 2025

(30) Foreign Application Priority Data

Dec. 16, 2021 (KR) ........................ 10-2021-0180418

(51) Int. Cl.
*G06V 20/40* (2022.01)
*G06V 10/77* (2022.01)
*G06V 10/82* (2022.01)

(52) U.S. Cl.
CPC .......... *G06V 20/42* (2022.01); *G06V 10/7715* (2022.01); *G06V 10/82* (2022.01); *G06V 20/46* (2022.01)

(58) Field of Classification Search
CPC .... G06V 20/42; G06V 10/7715; G06V 20/46; G06V 10/82
See application file for complete search history.

(56) References Cited

U.S. PATENT DOCUMENTS

2018/0300553 A1* 10/2018 Khosla .............. G06F 18/24133
2022/0164569 A1* 5/2022 Kim ..................... G06N 3/0464
2023/0134967 A1* 5/2023 Francesca ............. G06V 40/20
382/103

FOREIGN PATENT DOCUMENTS

KR 10-2020-0106526 A 9/2020
KR 10-2021-0026664 A 3/2021
KR 10-2264202 B1 6/2021
KR 10-2347639 B1 1/2022
KR 10-2433216 B1 8/2022

OTHER PUBLICATIONS

Liu, Shaocan, Xin Ma, Hanbo Wu, and Yibin Li. "An end to end framework with adaptive spatio-temporal attention module for human action recognition." Ieee Access 8 (2020): 47220-47231. (Year: 2020).*

(Continued)

*Primary Examiner* — David Perlman
(74) *Attorney, Agent, or Firm* — Stein IP, LLC

(57) ABSTRACT

The present invention relates to an activity recognition apparatus and method in sports videos using CGAM. According to the present invention, the apparatus for recognizing an activity in a sports video using CGAM (cross granularity accumulation module) comprises an object feature extraction unit that receives a video to be analyzed into a temporal attention module (TAM) in frame units to distinguish importance between frames, sequentially inputs the frames distinguished by importance into a plurality of con- (Continued)

volution blocks and each spatial attention module (CBAM) placed between convolution blocks to output a first feature value, outputs a second feature value by a CGAM that generates an object representation by compressing different object information output from each spatial attention module, and extracts an object feature value by multiplying the first feature value and the second feature value; and an activity feature extraction unit that sequentially inputs the extracted object feature values into a recurrent neural network (RNN) and a fully-connected (FC) layer and classifies a final activity from a probability value for each activity estimated using a sigmoid function.

12 Claims, 5 Drawing Sheets

(56) References Cited

OTHER PUBLICATIONS

Eun-Soo Park et al., "Preprocessing Methods for Action Recognition Model in 360-degree ERP Video".
Minhas, Rabia A. et al. Shot Classification of Field Sports Videos Using AlexNet Convolutional Neural Network. applied sciences. Jan. 30, 2019, vol. 9, No. 3, pp. 1-22.

* cited by examiner

APPARATUS FOR RECOGNIZING ACTIVITY IN SPORTS VIDEO USING CROSS GRANULARITY ACCUMULATION MODULE AND METHOD THEREOF

CROSS-REFERENCE TO RELATED APPLICATIONS

This application is a national stage of International Application No. PCT/KR2022/003141, filed Mar. 7, 2022, which claims the benefit of Korean Application No. 10-2021-0180418, filed Dec. 16, 2021, in the Korean Intellectual Property Office, the disclosures of which are incorporated herein by reference.

TECHNICAL FIELD

The present invention relates to an activity recognition apparatus and method in sports videos using CGAM, and more specifically, it relates to an activity recognition apparatus and method in sports videos using CGAM for extracting activity information from sports videos by adding a CGAM (Cross Granularity Accumulation Module) for identifying spatial information in a convolutional neural network (CNN) in the object feature extraction process.

BACKGROUND ART

Recently, with the high penetration rate of video recording equipment such as smartphones and the significant development of video platforms such as YouTube, the importance of video understanding research that can handle video from various angles is increasing. According to the 2019 CISCO Visual Networking Index, 75% of the world's web traffic is traffic generated by video, and a total of 500 hours of video are uploaded to YouTube every minute. In order to process such a large number of videos in various aspects such as the content of the videos, research is continuously being conducted to generate a deep learning-based video understanding system.

Activity recognition is the problem of classifying what activity is occurring within a given video and is one of the areas of video understanding research. As activity recognition technology develops, much research is being conducted to use activity recognition in various fields. The sports field is one field that utilizes activity recognition. Sports game videos record game performances that can be seen through the players' activities.

Game video analysis using activity recognition technology can be used to understand players' performance and formulate training processes and winning strategies to improve players' performance. Additionally, in recent professional sports games, research is being conducted on robot referees based on deep learning models that detect activities or game situations through game videos to solve the problem of referees' incorrect decisions.

Activity recognition technology is divided into a sensor-based activity recognition method and a video-based activity recognition method, depending on the method of acquiring activity information.

First, the sensor-based activity recognition method is a method of recognizing activity by using various sensors such as accelerometers, magnetometers, and gyro sensors attached to an object and changes in sensor values according to the object's activity.

Compared to video-based activity recognition methods, this sensor-based activity recognition method shows excellent prediction results because information about human activity can be directly obtained through the sensor. However, since athletes cannot wear any electronic equipment in sports games, sensor-based activity recognition methods have the problem of being difficult to use to recognize sports activities.

The video-based activity recognition method extracts the features of the activity from the captured video and recognizes the activity of the object in the video.

The video-based activity recognition method can be a suitable method for sports activity recognition because it uses only videos. Conventional video-based activity recognition methods are configured in a two-stream format that uses not only RGB frames but also optical flow data to extract the features of activities in the video or use a 3D kernel-based convolutional neural network.

This video-based activity recognition method has proven excellent performance through various experiments, but it has the problem of requiring a lot of computer resources due to the large amount of calculations required and taking a lot of time during learning.

The technology behind the present invention is disclosed in Korean Patent Publication No. 10-2020-0106526 (published on Sep. 14, 2020).

DISCLOSURE

Technical Issues

The technical object to be achieved by the present invention is to provide an activity recognition apparatus and method in sports videos using CGAM to extract activity information in sports videos by adding CGAM to identify spatial information in a convolutional neural network in the object feature extraction process.

Technical Solution

In order to achieve the above object, according to an embodiment of the present invention, an apparatus for recognizing an activity in a sports video using CGAM (cross granularity accumulation module) comprises an object feature extraction unit that receives a video to be analyzed into a temporal attention module (TAM) in frame units to distinguish importance between frames, sequentially inputs the frames distinguished by importance into a plurality of convolution blocks and each spatial attention module (CBAM) placed between convolution blocks to output a first feature value, outputs a second feature value by a CGAM that generates an object representation by compressing different object information output from each spatial attention module, and extracts an object feature value by multiplying the first feature value and the second feature value; and an activity feature extraction unit that sequentially inputs the extracted object feature values into a recurrent neural network (RNN) and a fully-connected (FC) layer and classifies a final activity from a probability value for each activity estimated using a sigmoid function Further, the temporal attention module compresses an RGB color channel value of each input frame into one vector, calculates a temporal attention score for each frame output by inputting the compressed color channel value to an FC Layer, and distinguishes importance between frames by differentially emphasizing an important frame related to an activity by reflecting weight if the score is high.

Further, in the first feature value, frames distinguished by importance in the temporal attention module (TAM) are input to the convolution block to extract which objects are included in the frame. The extracted value is input to a spatial attention module to extract important spatial information. The information extracted by the spatial attention module is used as an input value for a next convolution block. It is output sequentially passing through the plurality of convolution blocks and a plurality of spatial attention modules.

Further, in the second feature value, an object representation is generated by compressing object information of different sizes output from each spatial attention module by the CGAM, and two values are calculated to produce an output after matching the number of dimensions with the object information output from the next placed spatial attention module using max pooling technique, which compresses and outputs only the largest value from the object information output from the spatial attention module, and inflating technique, which expands the number of dimensions.

Further, the object feature extraction unit adds the two values and averages them to generate new object information after matching the number of dimensions with the object information output from the next placed spatial attention module using the max pooling technique and the inflating technique on the object information output from a first spatial attention module, and outputs object representation generated by repeatedly applying the calculation process between object information output from the next placed spatial attention module by using the max pooling technique and the inflating technique on the generated object information and the value whose dimension number matches to the object information output from all spatial attention modules, as the second feature value.

Further, the activity feature extraction unit extracts activity information by inputting the extracted object feature value into an LSTM (Long-Short Term Memory) model, and inputs the extracted activity information into the FC Layer to estimate a probability value for each activity, and if a probability value of a specific activity is greater than a threshold value, and determines that the corresponding activity occurred in the video and classifies the final activity.

Further, according to another embodiment of the present invention, a method for recognizing an activity in a sports video using a cross granularity accumulation module (CGAM) comprises inputting a video to be analyzed into a temporal attention module (TAM) in frame units to distinguish importance between frames; sequentially inputting the frames distinguished by importance into a plurality of convolution blocks and each spatial attention module (CBAM) disposed between convolution blocks to output a first feature value; outputting a second feature value by a CGAM that generates object representation by compressing different object information output from each spatial attention module; extracting an object feature value by multiplying the first feature value and the second feature value; sequentially inputting the extracted object feature value into a recurrent neural network (RNN) and a fully-connected (FC) layer and estimating a probability value for each activity using a sigmoid function; and classifying a final activity using the output probability value for each activity.

Further, the distinguishing importance between the frames comprises compressing an RGB color channel value of each input frame into one vector, inputting the compressed color channel value to the FC Layer to calculate the temporal attention score for each output frame, and distinguishing importance between frames by differentially emphasizing important frames related to an activity by reflecting weight if the score is high.

Further, the outputting of the first feature value comprises inputting frames distinguished by importance in the temporal attention module (TAM) to the convolution block to extract which objects are included in the frame, and inputting the extracted values to a spatial attention module to extract important spatial information, and using the information extracted by the spatial attention module as an input value for a next convolution block and producing output by sequentially passing through the plurality of convolution blocks and a plurality of spatial attention modules.

Further, the outputting of the second feature value comprises generating object representation by compressing object information of different sizes output from each spatial attention module by the CGAM, calculating two values to produce an output after matching the number of dimensions with the object information output from the next placed spatial attention module using max pooling technique, which compresses and outputs only the largest value from the object information output from the spatial attention module, and inflating technique, which expands the number of dimensions.

Further, the outputting the second feature value comprises adding the two values and averaging them to generate new object information after matching the number of dimensions with the object information output from the next placed spatial attention module using the max pooling technique and the inflating technique on the object information output from a first spatial attention module, and outputting object expression generated by repeatedly applying the calculation process between object information output from the next placed spatial attention module by using the max pooling technique and the inflating technique on the generated object information and the value whose dimension number matches to object information output from all spatial attention modules as the second feature value.

Further, the estimating of a probability value for each activity comprises extracting activity information by inputting the extracted object feature value into a long-short term memory (LSTM) model, and inputting the extracted activity information into the FC Layer to estimate the probability value for each activity, wherein the classifying the final activity comprises determining that the corresponding activity in the video occurred when the probability value of a specific activity is greater than a threshold value and classifying the final activity.

Advantageous Effects

According to the present invention, by adding CGAM for recognizing spatial information in the convolutional neural network in the object feature extraction process, it is possible to extract activity information from sports videos by considering both temporal and spatial features.

In addition, according to the present invention, feature information of objects in the video is extracted using a temporal attention module (TAM), a spatial attention module (convolutional block attention module (CBAM)), and CGAM on a two-dimensional kernel-based convolutional neural network, and the object's activity information is extracted using a recurrent neural network (RNN) so that the object's feature information and the object's activity information can be extracted separately, allowing important features of the activity to be extracted more effectively.

Additionally, according to the present invention, activity information of an object can be extracted using only the RGB information of a video frame, and features for recognizing detailed activity can be extracted from object information of various sizes and the activity information.

Additionally, according to the present invention, since the features extracted through the spatial attention module are accumulated, the model calculation does not increase significantly, and in order to keep the amount of computation required in the information accumulation process low, the amount of computation can be reduced by applying inflating to the feature map and simply copying it based on the dimensional axis of the feature map to expand the number of dimensions, which has the effect of shortening the time required for learning.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
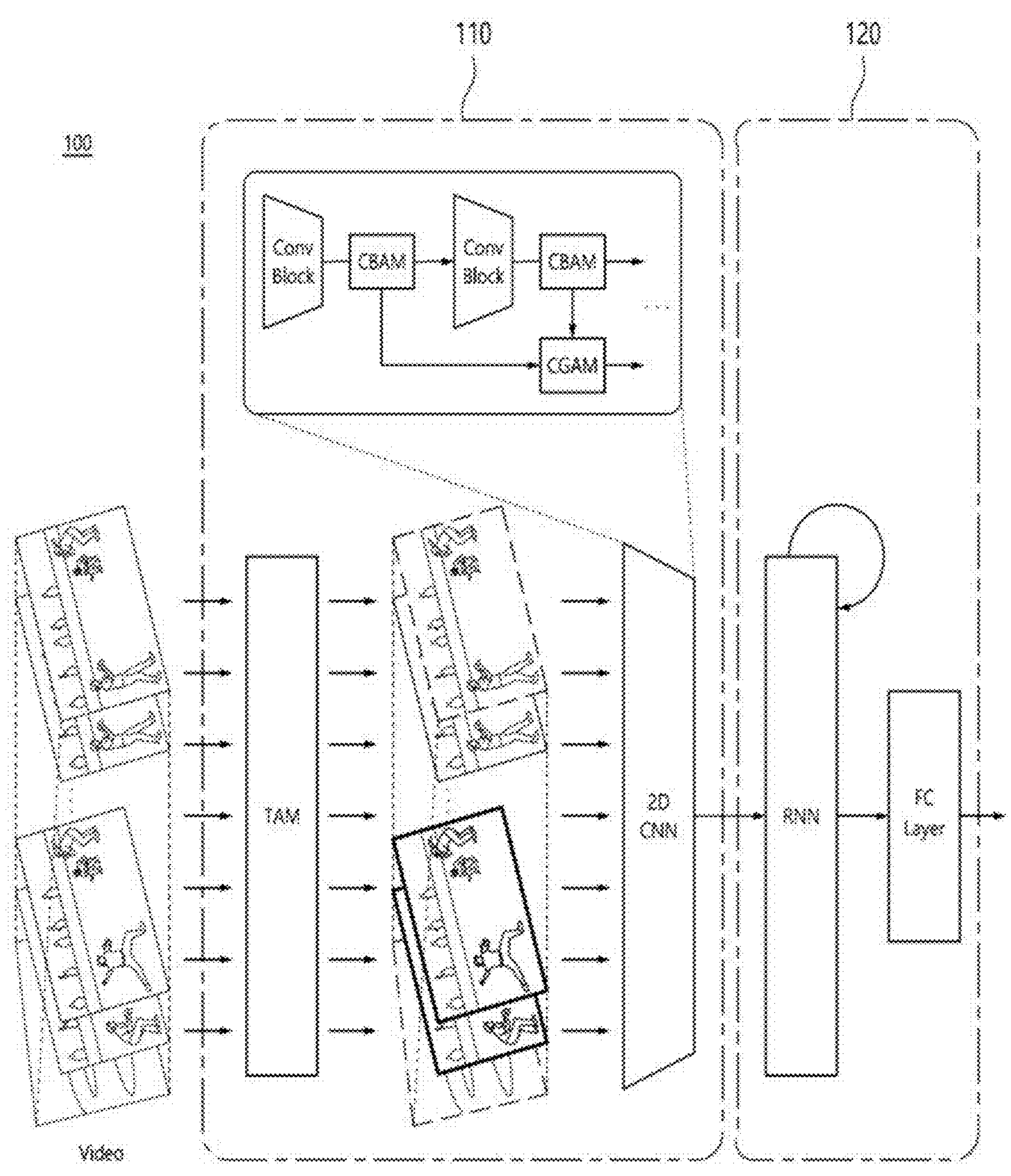
FIG. 1 is a configuration diagram showing an activity recognition apparatus in a sports video using CGAM according to an embodiment of the present invention.

Hereinafter, preferred embodiments according to the present invention will be described in detail with reference to the attached drawings. In this process, the thickness of lines or sizes of components shown in the drawing may be exaggerated for clarity and convenience of explanation.

Additionally, the terms described below are terms defined in consideration of functions in the present invention, and may vary depending on the intention or custom of the user or operator. Therefore, definitions of these terms should be made based on the content throughout this specification.

Hereinafter, preferred embodiments of the present invention will be described in more detail with reference to the drawings.

First, an apparatus for recognizing activities in sports videos using CGAM according to an embodiment of the present invention will be described with reference to FIGS. 1 to 5.

FIG. 1 is a configuration diagram showing an activity recognition apparatus in a sports video using CGAM according to an embodiment of the present invention.

As shown in FIG. 1, the apparatus 100 for recognizing activities in sports videos using CGAM according to an embodiment of the present invention includes an object feature extraction unit 110 and an activity feature extraction unit 120.

First, the object feature extraction unit 110 receives the video to be analyzed in frame units and distinguishes the frames by importance in the temporal attention module (TAM). And, the first feature value output by sequentially inputting the frames distinguished by importance to a plurality of convolution blocks and each spatial attention module (convolutional block attention module (CBAM)) placed between the convolution blocks, and the second feature value output by a CGAM (Cross Granularity Accumulation Module) that compresses different object information each output from each spatial attention module to generate an object representation is multiplied to extract the object feature value.

At this time, in the first feature value, frames distinguished by importance in TAM are input into a convolution block to extract which objects are included in the frame. Then, the extracted value is input into CBAM to extract important spatial information, and the extracted information by the CBAM is used as an input value for the next convolution block and sequentially passes through multiple convolution blocks and multiple CBAMs to produce the output.

In addition, in the second feature value, the CGAM compresses object information of different sizes output from each CBAM to generate an object representation, but using max pooling technique, which compresses and outputs only the largest value from the object information output from CBAM, and the inflating technique, which expands the number of dimensions, to match the number of dimensions with the object information output from the next placed spatial attention module, then the two values are calculated to produce the output.

To explain in detail how to output the second feature value, the number of dimensions is matched with the object information output from the next placed CBAM using the max pooling technique and the inflating technique on the object information output from the first CBAM, and the new object information is generated by adding and averaging the values, and by using the max pooling and inflating techniques on the generated object information, the calculation process between the object information output from CBAM the next time and the value whose dimension number matches is repeatedly applied to the object information output from all CBAMs, and the generated object representation is output as the second feature value.

Figure 2:
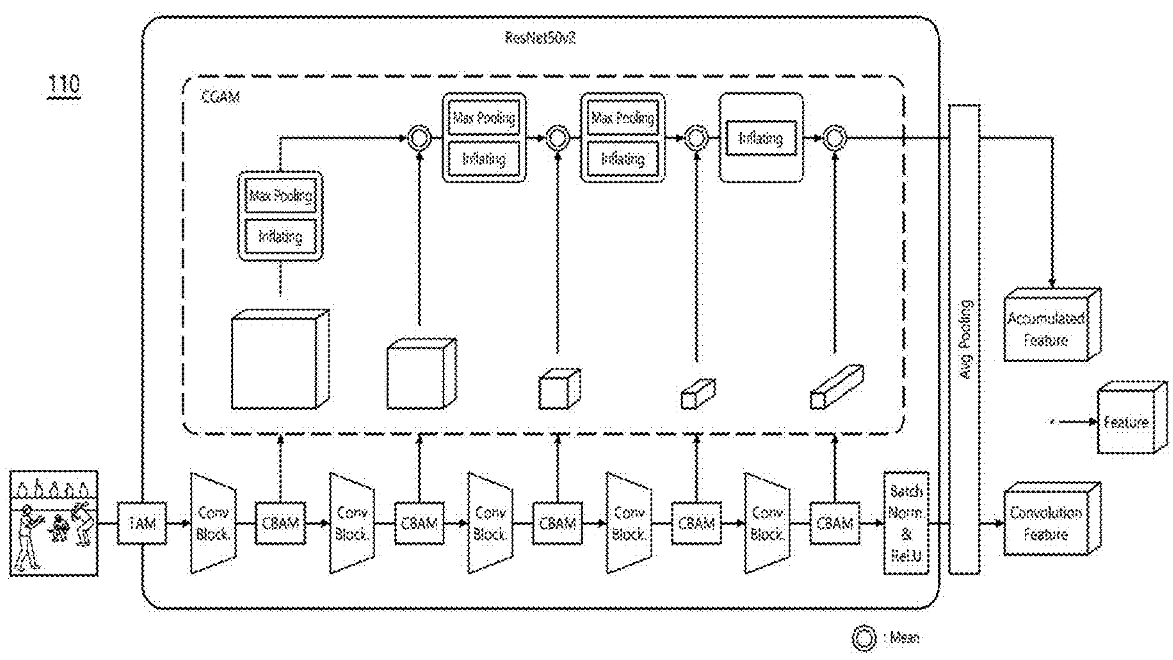
FIG. 2 is a detailed configuration diagram showing the object feature extraction unit of FIG. 1.

FIG. 2 is a detailed configuration diagram showing the object feature extraction unit of FIG. 1.

To describe the object feature extraction unit 110 in detail with reference to FIG. 2, the object feature extraction unit 110 uses a frame unit attention module and a 2D kernel-based convolutional neural network (CNN) to extract important object information of activity from the RGB frame. In an embodiment of the present invention, TAM, CBAM, and CGAM are additionally used to reflect temporal and spatial information of the activity in the process of extracting features for the activity.

First, the keyframe most related to the activity is extracted from the multiple frames input through TAM.

Figure 3:
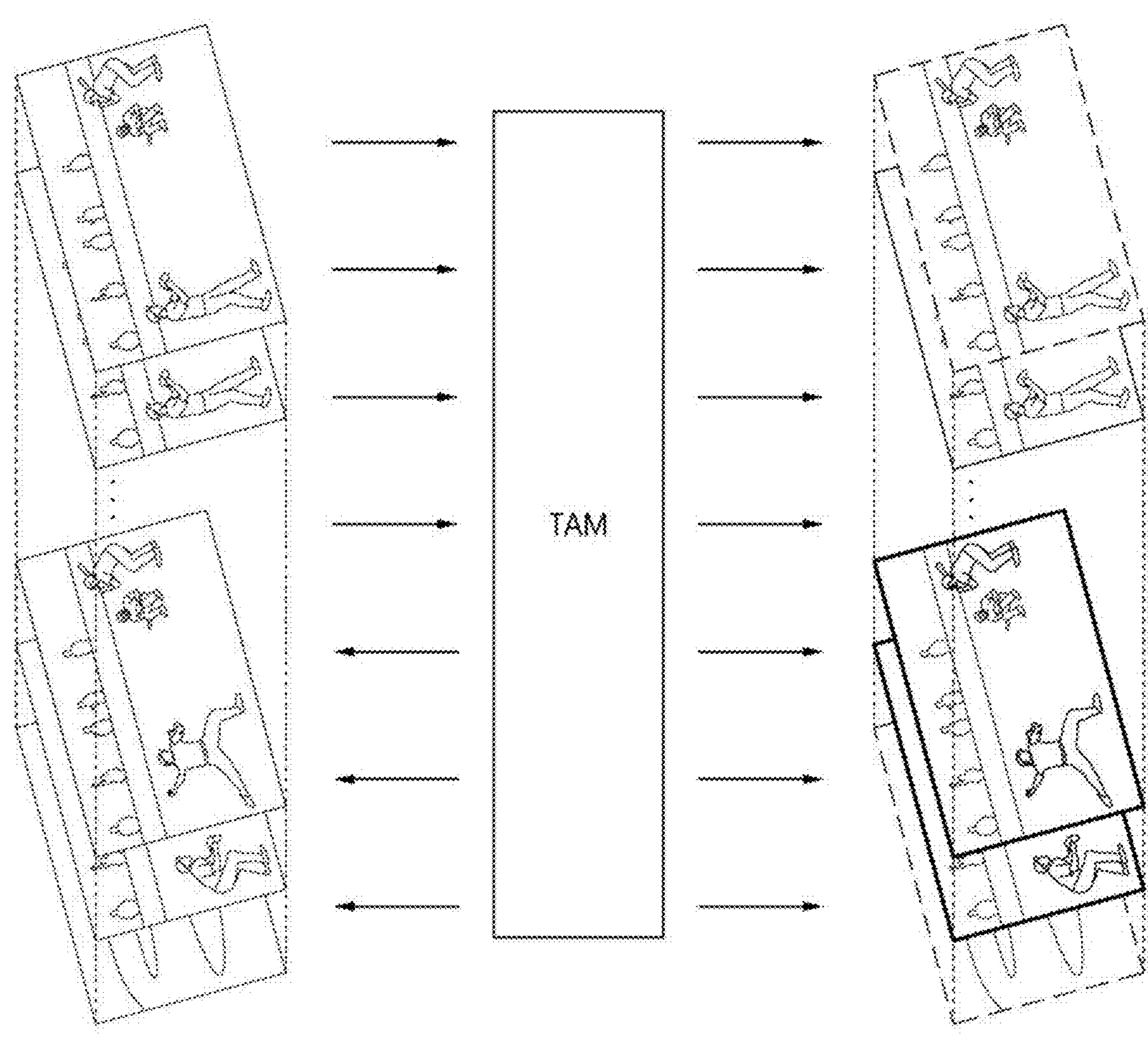
FIG. 3 is a diagram illustrating a temporal attention module (TAM) according to an embodiment of the present invention.

FIG. 3 is a diagram illustrating a temporal attention module according to an embodiment of the present invention.

To explain the process of distinguishing importance between frames with reference to FIG. 3, TAM compresses the RGB color channel value of each input frame into one vector, calculates a temporal attention score for each frame output by inputting the compressed color channel values into the FC Layer, and distinguishes the importance between frames by reflecting the weight to differentially emphasizing the more important frames related to the activity if the score is high.

In other words, TAM is a module that calculates the attention score for each frame to emphasize key frames related to the activity and suppress other frames. Therefore, frame information ($\{v_1, v_2, \ldots, v_N\}$) extracted from the video (V) is given as input to TAM. Here, N represents the maximum number of input frames, and each frame v is expressed in the form of a tensor of H×W×3. At this time, H×W means the height and width of frame v, and 3 means the r channel ($v^r$), g channel ($v^g$), and b channel ($v^b$) of frame v, respectively.

The temporal attention score ( $$\alpha_t^r$$

$\in \mathbb{R}^N$) for the tth frame of the video is defined as follows in Equation 1. At this time, the frame at a specific point t in the video V is expressed as $v_t$. First, to generate a frame vector $$v_t'$$

$\in \mathbb{R}^{224\times224\times1}$ with compressed color channel information, channel-wise sum is performed by adding all the color channel values $v^r$, $v^g$, $v^h$ of the input frame $v_t$. Then, to compress the frame vector with compressed color channel information into a single scalar, the maximum information value $$c_t^{max}$$

of the frame and the average information value $$c_t^{avg}$$

of the frame are defined based on 2d max pooling $p_{dm}$ and 2d average pooling $p_{da}$, which compress information based on height and width, as in Equation 1 below.

$$c_t^{max} = p_{dm}(v_t') \in \mathbb{R}, \quad 1 \le t \le N, \qquad \text{[Equation 1]}$$

$$c_t^{avg} = p_{da}(v_t') \in \mathbb{R},$$

Here, $$c_t^{max}$$

is the maximum information value of the frame, $p_{dm}$ is a function that extracts the maximum value for the spatial axes of height and width, $$v_t'$$

is the frame vector with compressed color channel information, $$c_t^{avg}$$

is the average information value of the frame, and $p_{da}$ is 2d average pooling.

The frame information $$c_t^{tam}$$

integrated into one is defined as the following Equation 2 as the weighted sum of the frame information of the two aspects. The weight at this time is defined as the hyperparameter $\omega \in [0,1]$.

$$c_t^{tam} = c_t^{max} * \omega + c_t^{avg} * (1 - \omega) \in \mathbb{R}, \qquad \text{[Equation 2]}$$

Here, $$c_t^{tam}$$

is integrated frame information.

And, the temporal attention score $$\alpha_t^T$$

for each frame is defined as in Equation 3 below through the integrated frame information $$[c_t^{tam}, \ldots, c_N^{tam}] \in \mathbb{R}^N$$

for all frames and two consecutive FC layers.

$$\alpha_t^T = \sigma_m(L_{f2}(\sigma(L_{fc1}(c^{tam})))) \in \mathbb{R}, \qquad \text{[Equation 3]}$$

In Equation 3, $L_{fc1}$, $L_{fc2}$ means different FC layers, $\sigma$ means Rectified Linear Unit (ReLU), and $\sigma_m$ means softmax function. The conventional Liu et al. (2021) used the sigmoid function instead $\sigma_m$, but in the embodiment of the present invention, the softmax function was defined to give higher weight to the key frame. The weighted frame $$v_t'$$

is defined as the element-wise product of the temporal attention score $$\alpha_t^T$$

and the input frame $$v_t^r,$$

as shown in Equation 4 below.

$$v_t^r = \alpha_t^T * v_t \in \mathbb{R}^{H\times W\times 3}, \quad \text{[Equation 4]}$$

Then, the frame vector $$v_t^r$$

weighted through TAM is given as input to the 2D CNN to extract object information within the frame.

The 2D CNN module in the embodiment of the present invention consists of ResNet50V2, CBAM, and CGAM. CBAM is located between each convolution block of ResNet50V2, and the output of the module is given as the input of ResNet50V2 in the next step. In the embodiment of the present invention, a total of 5 CBAMs are used, but it is not limited thereto. At this time, ResNet50v2 and CBAM are expressed as $\varphi^R$ and $\varphi^B$, respectively, and each block is divided into subscripts. In this stacked structure, the feature map $$f_{t,k}^B$$

of the kth block of the tth frame is defined as shown in Equation 5 below.

$$f_{t,k}^B = \varphi_k^B(\varphi_k^R(f_{t,k-1}^B)),\ f_{t,0}^B = v_t^r,\ \ 1 \le k \le 5. \quad \text{[Equation 5]}$$

In other words, CBAM is a module for extracting important spatial information in the process of extracting object features. CBAM consists of channel-wise attention and spatial-wise attention. As the input to CBAM, the feature map, $$\varphi_k^R(f_{t,k-1}^B)$$

extracted with ResNet50V2

$$\varphi_k^R$$

from the k th convolution block is used. The feature map, $$\varphi_k^R(f_{t,k-1}^B)$$

is expressed as $$f_k^R$$

for readability. The calculation process $$\varphi_k^B$$

of CBAM is shown in Equations 6 to 8 below. First, the channel-wise attention map $$\alpha_k^c$$

is defined in Equation 6 below.

$$\alpha_k^c = \sigma_s(L_{fc3}(L_{fc4}(p_{dm}(f_k^R))) + L_{fc3}(L_{fc4}(p_{da}(f_k^R)))) \in \mathbb{R}^{1\times 1\times C}, \quad \text{[Equation 6]}$$

Here, C means the dimension of $F_k$, $L_{fc3}$, $L_{fc4}$ means different FC layers, and $\sigma_s$ means the sigmoid function. Afterward, $f_k$ given as input to CBAM is multiplied by $$\alpha_k^c$$

to reflect the channel-wise attention results.

At this time, the feature map $$f_k^c$$

reflecting the results of channel axis attention is defined as shown in Equation 7 below.

$$f_k^c = \alpha_k^c * f_k^R \in \mathbb{R}^{H\times W\times C}, \quad \text{[Equation 7]}$$

And the spatial-wise attention map $$\alpha_k^s$$

is defined as follows in Equation 8 using $$f_k^c.$$

$$\alpha_k^s = \sigma_s(L_{conv}([p_{cm}(f_k^c);\ p_{ca}(f_k^c)])) \in \mathbb{R}^{H\times W\times 1}, \quad \text{[Equation 8]}$$

In Equation 8, $L_{conv}$ means a convolution layer using a 7*7 kernel, and $$[p_{cm}(f_k^c); p_{ca}(f_k^c)]$$

means concatenating the features obtained through two channel-wise max pooling $p_{cm}$ and channel-wise average pooling to $$f_k^c$$

on the channel axis. A sigmoid function is applied to the feature map obtained through the convolution layer for the two concatenated features to generate a spatial attention map $$a_k^s$$

(first feature value).

At this time, the final output $$f_k^B$$

of the kth CBAM block is defined as in Equation 9 below.

$$f_k^B = \alpha_k^s * f_k^c \in \mathbb{R}^{H \times W \times C}, \quad \text{[Equation 9]}$$

The feature map $$f_k^B$$

generated through CBAM is used as an input to the convolution block of the next residual neural network (hereinafter referred to as Resnet).

For some activities in the sports domain, information about multiple objects within the frame is important to identify the activity. For example, foul activity in baseball is defined as the activity of the batter hitting the ball and crossing the foul line, so in order to identify this foul activity, sub-activity information such as activity information about the batter or activity information about the ball should also be identified. However, in the case of object features extracted using Resnet and CBAM, object information for recognizing sub-activities may be lost because object features are extracted by emphasizing only important parts through attention scores. For example, through residual neural networks and CBAM, the activity information of the batter within the frame can be well recognized, but the activity information about the ball, which is smaller than the batter and passes by in an instant, may not be well recognized.

Accordingly, an embodiment of the present invention includes CGAM which generates object representations through a separate path in order to generate detailed representations of multiple objects included in a sports game video.

Here, CGAM is a method of compressing the spatial information of feature maps of various sizes with object information of various granularity extracted through each CBAM to ultimately generate a single integrated feature representation. When CGAM according to an embodiment of the present invention generates features, model calculations do not increase significantly because it accumulates features extracted through Resnet blocks and CBAM without using separate learnable parameters.

As shown in FIG. 2, important information spatially compressed in CGAM is defined through 2d max pooling $p_{cgm}$ with a kernel size of 2*2 in the feature map $$f_k^B$$

of CBAM. Afterward, in order to compress additional information, the validity of the present invention will be verified by using the simplest average.

The feature map $$f_k^G$$

in which spatial information is compressed is averaged with the feature map $$f_{k+1}^B$$

of the next CBAM to accumulate information. At this time, the sizes of the object information $$f_k^G \text{ and } f_{k+1}^B$$

are different, so the average cannot be calculated directly. The feature map $$f_k^B$$

size (shape) obtained from each CBAM is shown in Table 1 below.

TABLE 1

| CBAM Output | Dimension |
|---|---|
| $f_1^B$ | 56 × 56 × 64 |
| $f_2^B$ | 28 × 28 × 256 |
| $f_3^B$ | 14 × 14 × 512 |
| $f_4^B$ | 7 × 7 × 1024 |
| $f_5^B$ | 7 × 7 × 2048 |

The problem of not being able to calculate because the feature dimension of the feature map is different can be solved by embedding the feature map in a different dimension to generate a new representation and then performing the calculation. However, there is a problem that the amount of computation required during the embedding process increases. Therefore, in an embodiment of the present invention, in order to keep the amount of calculations required in the information accumulation process low, a method of applying inflating to the feature map and expanding the number of dimensions by simply copying the dimensional axis of the feature map as a reference was used.

Figure 4:
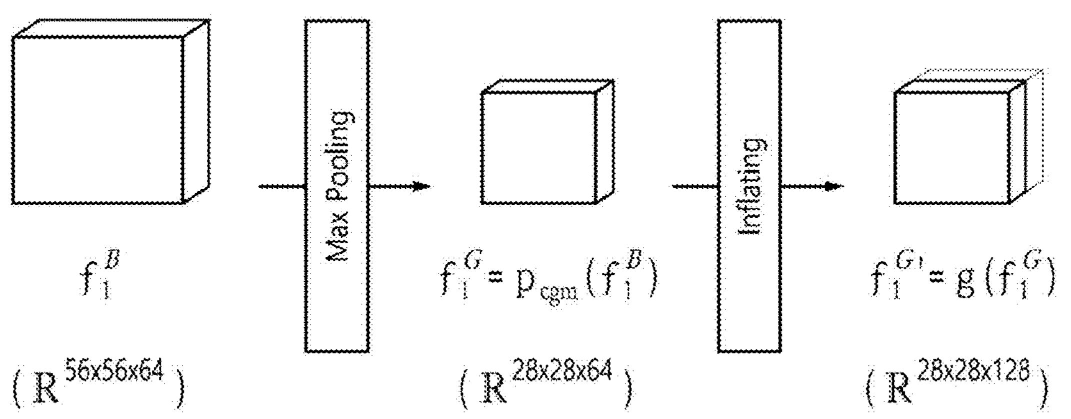
FIG. 4 is a diagram illustrating the max pooling technique and the inflating technique in CGAM according to an embodiment of the present invention.

FIG. 4 is a diagram illustrating the max pooling technique and the inflating technique in CGAM according to an embodiment of the present invention.

An example of applying 2d max pooling $p_{cgm}$ and inflating g to the feature map $$f_k^B$$

is shown in FIG. 4.

The feature map $$f_k^{G'}$$

processed through $p_{cgm}$ and g accumulates information through averaging with the next CBAM output $$f_{k+1}^B$$

and is given as input to the next accumulation process. In an embodiment of the present invention, in order to maintain the same form of the accumulated feature map generated through CGAM and the final feature map of the input frame extracted through ResNet and CBAM, 2d max pooling is performed in only 3 of the 4 accumulation steps, and the last step uses only inflating. The process of generating a feature map $$f_l^G$$

(second feature value) in which information is accumulated through CGAM is defined as follows in Equation 10.

$$f_l^G = \begin{cases} f_l^B, & l = 1 \\ \frac{1}{2}\left(g\left(p_{cgm}\left(f_{l-1}^G\right)\right) + f_l^B\right) & 2 \le l \le 4, \\ \frac{1}{2}\left(g\left(f_{l-1}^G\right) + f_l^B\right) & l = 5. \end{cases} \quad \text{[Equation 10]}$$

Here, I means accumulation step. The final feature map $$F_t^B = f_{t,5}^B \in \mathbb{R}^{7\times7\times2048}$$

extracted using ResNet and CBAM, and the final feature map $$F_t^G = f_{t,5}^G \in \mathbb{R}^{7\times7\times2048}$$

through CGAM have the same form. Therefore, the final object representation $$F_t^e$$

for the input frame $$v_t'.$$

is defined as element-wise multiply as shown in Equation 11 below after applying 2d average pooling $p_{da}$ to each of the two feature maps $$F_t^B, F_t^G.$$

$$F_t^e = p_{da}\left(F_t^B\right) * p_{da}\left(F_t^G\right) \in \mathbb{R}^{2048}. \quad \text{[Equation 11]}$$

At this time, the object representation $$F_t^e$$

for the input frame $$v_t'$$

extracted from the object feature extraction unit 110 is given as input to the activity feature extraction unit 120.

The activity feature extraction unit 120 sequentially inputs the object feature values extracted from the object feature extraction unit 110 into a recurrent neural network (RNN) and a fully connected (FC) layer and classifies the final activity from the probability value for each activity estimated using a sigmoid function.

In detail, the activity feature extraction unit 120 extracts activity information by inputting the object feature values extracted from the object feature extraction unit 110 into a Long-Short Term Memory (LSTM) model, and inputs the extracted activity information into the FC Layer to estimate the probability value for each activity. If the probability value of a specific activity is greater than the threshold value, it is determined that the corresponding activity occurred in the video and the final activity is classified.

To explain this in detail, the activity feature extraction unit 120 identifies and learns the activity features included in the video using the object information $$(F_t^e)$$

for each frame extracted through the object feature extraction unit 110. At this time, activity can be viewed as time series information consisting of movement over time. In an embodiment of the present invention, LSTM may be used as an RNN structure for learning time series data.

LSTM is a model that alleviates the gradient vanishing problem through forgetting gates and input gates to solve the long-term dependency problem of existing RNNs. At this time, the LSTM hidden state $h_t$ for the t-th input frame is defined as Equation 12 below.

$$h_t = \psi(F_t^e, h_{t-1}) \in \mathbb{R}^{512}, \quad \text{[Equation 12]}$$

Here, $h_t$ is the LSTM hidden state, $\psi$ is the LSTM, and $$F_t^e$$

is the object information for each frame.

In order to estimate the probability of each activity included in video V in the last hidden state $h_N$ among the activity information extracted from video V through LSTM, the FC Layer ($L_{fc5}$) is used in the embodiment of the present invention. Afterward, the probability p=[p_1, . . . p_8] that a certain probability is included in the video is calculated using the sigmoid function. At this time, p is defined as in Equation 13 below.

$$p = \sigma_s(L_{fc5}(h_N)) \in \mathbb{R}^8. \quad \text{[Equation 13]}$$

Thereafter, the activity feature extraction unit 120 sets a threshold value ($\tau$) and, if the probability value of the specific activity is greater than the threshold value ($\tau$), determines that a specific activity has occurred in the video. When defining the inclusion of a specific activity a as C, the case where the probability value of the specific activity is greater than the threshold value ($\tau$) is set to 1, and the case where it is smaller is set to 0. This process is defined as Equation 14 below.

$$C_a = \begin{cases} 0, & \tau > p_a \\ 1, & \tau \le p_a \end{cases}, 1 \le a \le 8 \quad \text{[Equation 14]}$$

Figure 5:
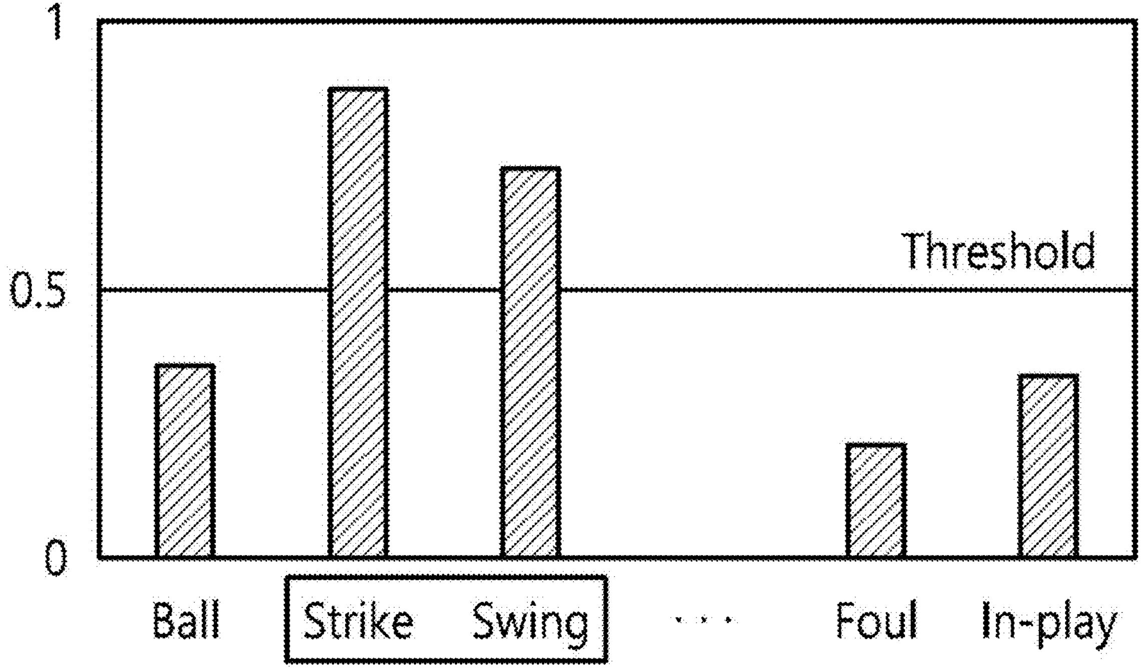
FIG. 5 is a diagram illustrating an activity feature extraction unit in an activity recognition apparatus in a sports video using CGAM according to an embodiment of the present invention.

FIG. 5 is a diagram illustrating an activity feature extraction unit in an activity recognition apparatus in a sports video using CGAM according to an embodiment of the present invention.

As shown in FIG. 5, the activity feature extraction unit 120 estimates the probability value for each activity using the feature values extracted from the object feature extraction unit 110, and if the probability value of a specific activity is greater than the threshold value (in FIG. 5, Strike and Swing activities), classifies the final activity by determining that the corresponding activity occurred in the video.

Hereinafter, a method of an activity recognition apparatus in a sports video using CGAM according to an embodiment of the present invention will be described with reference to FIG. 6.

Figure 6:
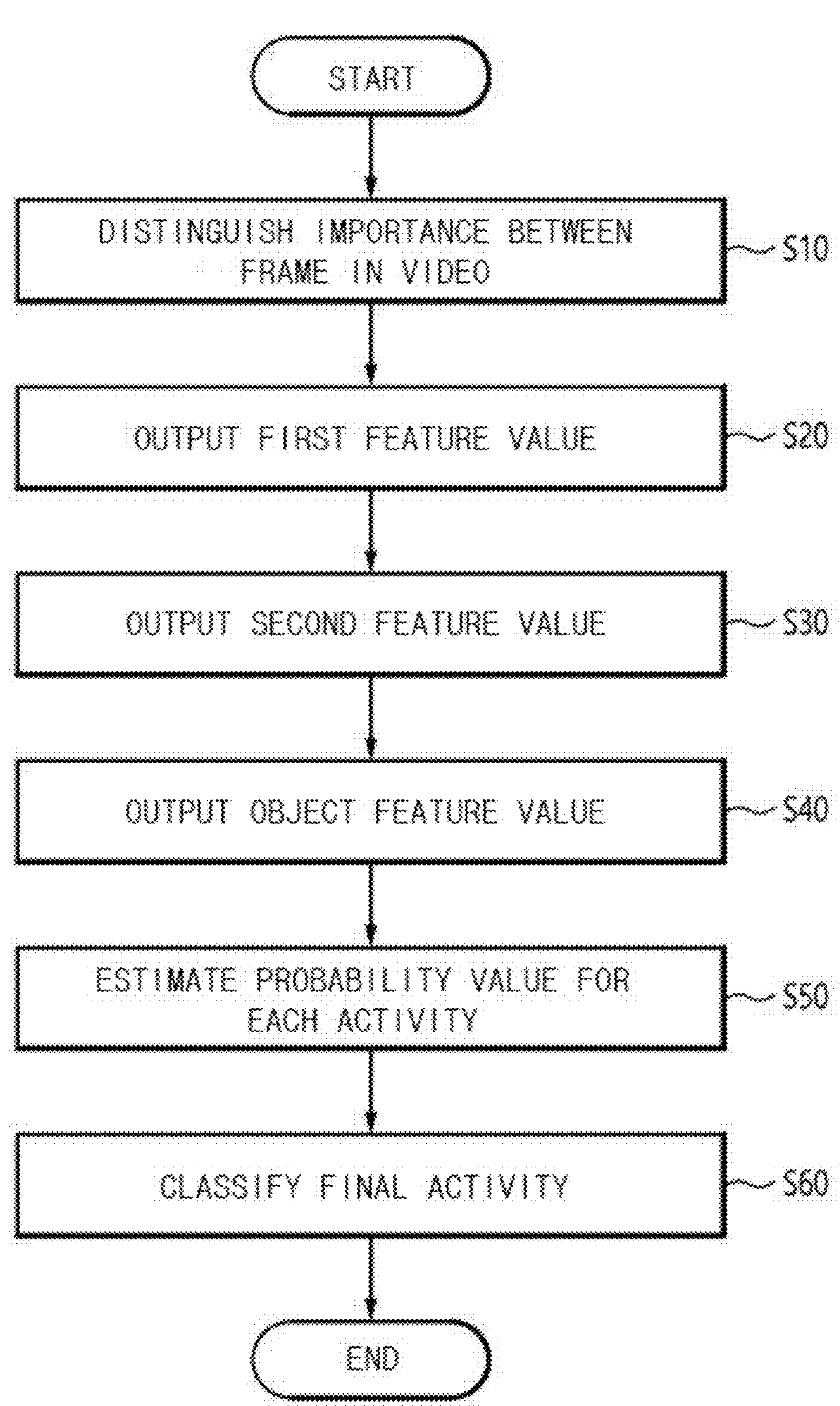
FIG. 6 is a flowchart showing the operation flow of a method for recognizing activity in sports videos using CGAM according to an embodiment of the present invention.

FIG. 6 is a flowchart showing the operation flow of a method of an activity recognition apparatus in a sports video using CGAM according to an embodiment of the present invention. With reference to this, the specific operation of the present invention will be described.

According to an embodiment of the present invention, the object feature extraction unit 110 first inputs the video to be analyzed into the TAM in units of frames and distinguishes the importance between frames (S10).

In step S10, the object feature extraction unit 110 compresses the RGB color channel value of each input frame into one vector, inputs the compressed color channel value into the FC Layer, and calculates a temporal attention score for each output frame. The higher the score, the more important frames related to the activity are differentially emphasized by reflecting the weight, allowing the importance of each frame to be distinguished.

Next, the object feature extraction unit 110 sequentially inputs frames distinguished by importance in step S10 into a plurality of convolution blocks, and each CBAM is placed between convolution blocks to output the first feature value (S20).

In step S20, the object feature extraction unit 110 inputs the frames distinguished by importance in step S10 into a convolution block to extract which objects are included in the frame, and then inputs the extracted values into CBAM to extract important spatial information. The information extracted by CBAM is used as the input value of the next convolution block and the output is produced by passing through multiple convolution blocks and multiple CBAM sequentially.

Next, the object feature extraction unit 110 compresses different object information output from each CBAM and outputs a second feature value by CGAM, which generates an object representation (S30).

In step S30, the object feature extraction unit 110 generates an object representation by compressing object information of different sizes output from each CBAM by CGAM, and after matching the number of dimensions with the object information output from the next placed CBAM using the max pooling technique, which compresses and outputs only the largest value from the object information output from CBAM, and the inflating technique, which expands the number of dimensions, the two values can be calculated and output.

In detail, the number of dimensions is matched with the object information output from the next placed CBAM using the max pooling technique and the inflating technique in the object information output from the first CBAM, then the two values are added and averaged to generate new object information. The max pooling technique and inflating technique are used on the generated object information and the calculation process between the object information output from the next placed CBAM and the value whose dimension number matches is repeatedly applied to the object information output from all CBAMs to output the object representation as a second feature value.

Next, the object feature extraction unit 110 extracts the object feature value by multiplying the first feature value output in step S20 and the second feature value output in step S30 (S40).

Next, the activity feature extraction unit 120 sequentially inputs the object feature values extracted in step S40 into the recurrent neural network (RNN) and the fully connected (FC) layer and estimates the probability value for each activity using the sigmoid function (S50).

In detail, the object feature values extracted in step S40 are input to the LSTM (Long-Short Term Memory) model to extract activity information, and the extracted activity information is input to the FC Layer to estimate the probability value for each activity.

Finally, the activity feature extraction unit 120 classifies the final activity using the probability value for each activity output in step S50 (S60).

In detail, if the probability value of a specific activity is greater than the threshold value, it is determined that the corresponding activity occurred in the video and the final activity is classified.

In an embodiment of the present invention, experiments were conducted using various models to compare the performance of the present invention. The modification of the proposed model was determined by the combination of additional modules such as TAM, CBAM, and CGAM.

The first is the ResNet+LSTM model without any modules, the second is the TAM+ResNet+LSTM model, in which TAM, a temporal attention module, is added to ResNet+LSTM, and the third is ResNet+CBAM+LSTM model, in which CBAM, the spatial attention module, is added to ResNet+LSTM, and the fourth is the TAM+ResNet+CBAM+LSTM model with both attention modules added.

In an embodiment of the present invention, the model is expressed using only the first letter of each model component for readability. That is, a model using ResNet and LSTM is expressed as RCL, a model using TAM, ResNet, and LSTM is expressed as TRL, a model using ResNet, CBAM, and LSTM is expressed as RCL, and a model using TAM, ResNet, CBAM, and LSTM is expressed as TRCL. As an indicator for evaluation, mAP was used in verification. The experimental results of the evaluation data through these models are shown in Table 2 below. In Table 2, ‘RGB’ refers to the experimental results when only RGB frames were used as input to the model, ‘Flow’ refers to the experimental results when only optical flow data was used, and ‘Two-stream’ refers to the experimental results when both RGB frames and optical flow data were used as inputs to the model.

TABLE 2

| Model Structure | RGB | Flow | Two-stream |
|---|---|---|---|
| I3D + Sub-events | 55.5 | 61.2 | 61.3 |
| Inceptionv3 + Sub-events (Piergiovanni and Ryoo 2018) | 56.2 | 62.5 | 62.6 |
| ResNet + LSTM (RL) | 51.7 | — | — |
| TAM + ResNet + LSTM (TRL) | 59.0 | — | — |
| ResNet + CBAM + LSTM (RCL) | 62.4 | — | — |
| TAM + ResNet + CBAM + LSTM (TRCL) | 63.6 | — | — |
| TAM + ResNet + CBAM + CGAM + LSTM (Proposed model) | 65.5 | — | — |

As shown in Table 2 above, the method (proposed model) according to an embodiment of the present invention shows the best performance compared to existing methods. Even though the proposed method uses only RGB frames, it shows a mAP value that is about 3% higher than the model of Piergiovanni and Ryoo (2018). If compared based on the case where only the RGB frame is used, it can be seen that the method according to the embodiment of the present invention shows a mAP value that is about 10% higher than that of the existing study. Additionally, when comparing the TRCL model and the proposed model, it can be seen that the mAP value is 1.9% higher.

In order to use the activity recognition model to expand the sports video understanding industry in the future, it is important for the model to accurately identify the activities in the video. However, when the model's performance is simply evaluated based on mAP, it is evaluated only for cases where the activity actually occurred among those determined by the model to have occurred, and it is not evaluated for cases where the activity actually occurred but the activity recognition model did not detect. Therefore, in an embodiment of the present invention, Accuracy, Recall, and F1-score are used in addition to Precision to more accurately identify the activity recognition performance of the model. In the same way as the mAP calculation process, each indicator value obtained by activity is added up and then divided by the number of classes to calculate each indicator value. Table 3 below shows the activity recognition results of various models in more detail.

In Table 3 below, mACC represents the mean average accuracy, mAR represents the mean average recall, and mAF1 represents the mean average f1 score.

TABLE 3

| Model | mAA | mAP | mAR | mAFI |
|---|---|---|---|---|
| Inceptionv3 + Sub-events (Piergiovanni and Ryoo 2018) | — | 62.6 | — | — |
| ResNet + LSTM (RL) | 55.2 | 51.7 | 45.3 | 48.2 |
| TAM + ResNet + LSTM (TRL) | 69.7 | 59.0 | 42.3 | 46.6 |
| ResNet + CBAM + LSTM (RCL) | 70.4 | 62.4 | 40.9 | 49.1 |
| TAM + ResNet + CBAM + LSTM (TRCL) | 86.6 | 63.6 | 42.4 | 50.9 |
| TAM + ResNet + CBAM + CGAM + LSTM (Proposed model) | 93.1 | 65.5 | 62.9 | 64.1 |

As shown in Table 3 above, the activity recognition ability of each model can be evaluated through a detailed analysis of the experimental results. Among the models generated for comparison, RCL and TRCL are 62.4 and 63.6, showing similar or higher mAPs than the study by Piergiovanni and Ryoo (2018). However, in both models, it can be seen that the mAR value is significantly different from the mAP value. This means that there are many false negative cases in which the model determines that no activity has occurred, even though activity has actually occurred, resulting in low mAR and mAF1 values. However, in the case of the method according to the embodiment of the present invention, it can be seen that not only mAP but also mAR and mAF1 show the highest values.

Such an apparatus and method for recognizing activities in sports videos using CGAM may be implemented as an application or in the form of program instructions that can be executed through various computer components and recorded on a computer-readable recording medium. The computer-readable recording medium may include program instructions, data files, data structures, etc., singly or in combination.

The program instructions recorded on the computer-readable recording medium may be those specifically designed and configured for the present invention, or may be known and usable by those skilled in the computer software field.

Examples of computer-readable recording media include magnetic media such as hard disks, floppy disks, and magnetic tapes, optical recording media such as CD-ROMs and DVDs, and magneto-optical media such as floptical disks, and hardware devices specifically configured to store and perform program instructions, such as ROM, RAM, flash memory, etc.

Examples of program instructions include not only machine language code such as that created by a compiler, but also high-level language code that can be executed by a computer using an interpreter or the like. The hardware device may be configured to operate as one or more software modules to perform processing according to the invention.

As described above, the apparatus and method for recognizing activities in sports videos using CGAM according to an embodiment of the present invention adds CGAM for identifying spatial information to a convolutional neural network in the object feature extraction process so that activity information from sports videos can be extracted by considering both the temporal features and spatial features.

In addition, according to an embodiment of the present invention, feature information of an object in a video is extracted using a temporal attention module, a spatial attention module, and CGAM in a two-dimensional kernel-based convolutional neural network, and a recurrent neural network is used to extract the feature information of the object. By extracting the object's activity information using a recurrent neural network, the object's feature information, and the object's activity information can be extracted separately, allowing the important features of the activity to be extracted more effectively.

Additionally, according to an embodiment of the present invention, activity information of an object can be extracted using only the RGB information of a video frame, and features for recognizing detailed activity can be extracted from object information of various sizes and activity information.

In addition, according to an embodiment of the present invention, since features extracted through a spatial attention module are accumulated, model calculations do not increase significantly, and inflating is applied to the feature map to keep the amount of calculations required in the information accumulation process low. By using a method of expanding the number of dimensions by copying based on the dimensional axis of the feature map, the amount of computation can be reduced and the time required for learning can be shortened.

The present invention has been described with reference to the embodiments shown in the drawings, but these are merely illustrative, and those skilled in the art will understand that various modifications and other equivalent embodiments are possible therefrom. Therefore, the true technical protection scope of the present invention should be determined by the technical spirit of the patent claims below.

REFERENCE NUMERALS

100: activity recognition apparatus 110: object feature extraction unit

120: activity feature extraction unit

The invention claimed is:

1. An apparatus for recognizing an activity in a sports video using CGAM (cross granularity accumulation module) comprising:

an object feature extraction unit that receives a video to be analyzed into a temporal attention module (TAM) in frame units to distinguish importance between frames, sequentially inputs the frames distinguished by importance into a plurality of convolution blocks and each spatial attention module (CBAM) placed between convolution blocks to output a first feature value, outputs a second feature value by a CGAM that generates an object representation by compressing different object information output from each spatial attention module, and extracts an object feature value by multiplying the first feature value and the second feature value; and an activity feature extraction unit that sequentially inputs the extracted object feature values into a recurrent neural network (RNN) and a fully connected (FC) layer and classifies a final activity from a probability value for each activity estimated using a sigmoid function.

2. The apparatus of claim 1, wherein the temporal attention module compresses an RGB color channel value of each input frame into one vector, calculates a temporal attention score for each frame output by inputting the compressed color channel value to an FC Layer and distinguishes importance between frames by differentially emphasizing an important frame related to an activity by reflecting weight if the score is high.

3. The apparatus of claim 1, wherein, in the first feature value, frames distinguished by importance in the temporal attention module (TAM) are input to the convolution block to extract which objects are included in the frame, and the extracted value is input to a spatial attention module to extract important spatial information, and the information extracted by the spatial attention module is used as an input value for a next convolution block and is output sequentially passing through the plurality of convolution blocks and a plurality of spatial attention modules.

4. The apparatus of claim 1, wherein, in the second feature value, an object representation is generated by compressing object information of different sizes output from each spatial attention module by the CGAM, two values are calculated to produce an output after matching the number of dimensions with the object information output from the next-placed spatial attention module using max pooling technique, which compresses and outputs only the largest value from the object information output from the spatial attention module, and inflating technique, which expands the number of dimensions.

5. The apparatus of claim 4, wherein the object feature extraction unit, adds the two values and averages them to generate new object information after matching the number of dimensions with the object information output from the next placed spatial attention module using the max pooling technique and the inflating technique on the object information output from a first spatial attention module, and outputs object representation generated by repeatedly applying the calculation process between object information output from the next placed spatial attention module by using the max pooling technique and the inflating technique on the generated object information and the value whose dimension number matches the object information output from all spatial attention modules, as the second feature value.

6. The apparatus of claim 1, wherein the activity feature extraction unit, extracts activity information by inputting the extracted object feature value into an LSTM (Long-Short Term Memory) model, and inputs the extracted activity information into the FC Layer to estimate a probability value for each activity, and if the probability value of a specific activity is greater than a threshold value, and determines that the corresponding activity occurred in the video and classifies the final activity.

7. A method for recognizing an activity in a sports video using a cross-granularity accumulation module (CGAM) comprising:

inputting a video to be analyzed into a temporal attention module (TAM) in frame units to distinguish importance between frames;

sequentially inputting the frames distinguished by importance into a plurality of convolution blocks and each spatial attention module (CBAM) placed between convolution blocks to output a first feature value;

outputting a second feature value by a CGAM that generates object representation by compressing different object information output from each spatial attention module;

extracting an object feature value by multiplying the first feature value and the second feature value;

sequentially inputting the extracted object feature value into a recurrent neural network (RNN) and a fully connected (FC) layer and estimating a probability value for each activity using a sigmoid function; and classifying a final activity using the output probability value for each activity.

8. The method of claim 7, wherein the distinguishing importance between the frames comprises, compressing an RGB color channel value of each input frame into one vector, inputting the compressed color channel value to the FC Layer to calculate the temporal attention score for each output frame, and distinguishing importance between frames by differentially emphasizing important frames related to an activity by reflecting weight if the score is high.

9. The method of claim 7, wherein the outputting of the first feature value comprises, inputting frames distinguished by importance in the temporal attention module (TAM) to the convolution block to extract which objects are included in the frame, and inputting the extracted values to a spatial attention module to extract important spatial information, and using the information extracted by the spatial attention module as an input value for a next convolution block and producing output by sequentially passing through the plurality of convolution blocks and a plurality of spatial attention modules.

10. The method of claim 7, wherein the outputting of the second feature value comprises, generating object representation by compressing object information of different sizes output from each spatial attention module by the CGAM, calculating two values to produce an output after matching the number of dimensions with the object information output from the next placed spatial attention module using max pooling technique, which compresses and outputs only the largest value from the object information output from the spatial attention module, and inflating technique, which expands the number of dimensions.

11. The method of claim 10, wherein the outputting of the second feature value comprises, adding the two values and averaging them to generate new object information after matching the number of dimensions with the object information output from the next placed spatial attention module using the max pooling technique and the inflating technique on the object information output from a first spatial attention module, and outputting object expression generated by repeatedly applying the calculation process between object information output from the next placed spatial attention module by using the max pooling technique and the inflating technique on the generated object information and the value whose dimension number matches to object information output from all spatial attention modules as the second feature value.

12. The method of claim 7, wherein the estimating a probability value for each activity comprises, extracting activity information by inputting the extracted object feature value into a long-short term memory (LSTM) model, and inputting the extracted activity information into the FC Layer to estimate the probability value for each activity, wherein the classifying the final activity comprises, determining that the corresponding activity in the video occurred when the probability value of a specific activity is greater than a threshold value and classifying the final activity.

* * * * *